April 7, 1959 — J. PERRELLI — 2,880,774
PITTER FOR DRUPES
Filed Aug. 16, 1955 — 3 Sheets-Sheet 1
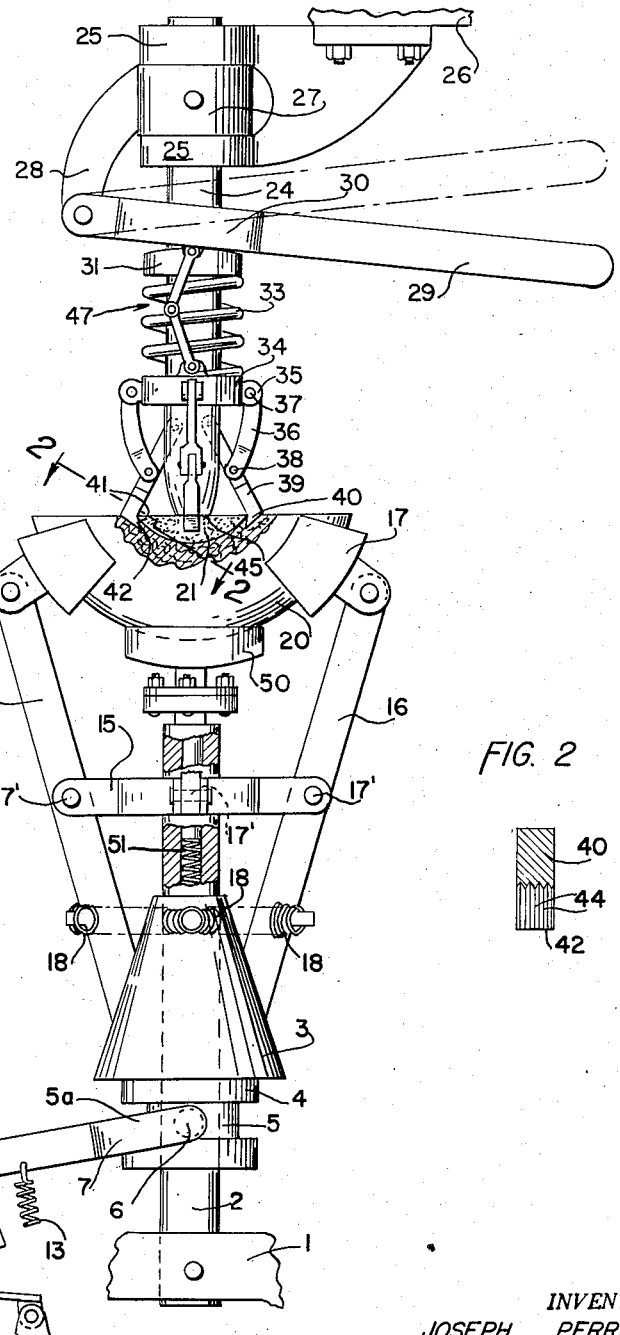
INVENTOR.
JOSEPH PERRELLI
BY
Boykin, Mohler & Wood
ATTORNEYS April 7, 1959
J. PERRELLI
2,880,774
PITTER FOR DRUPES
Filed Aug. 16, 1955
3 Sheets-Sheet 2
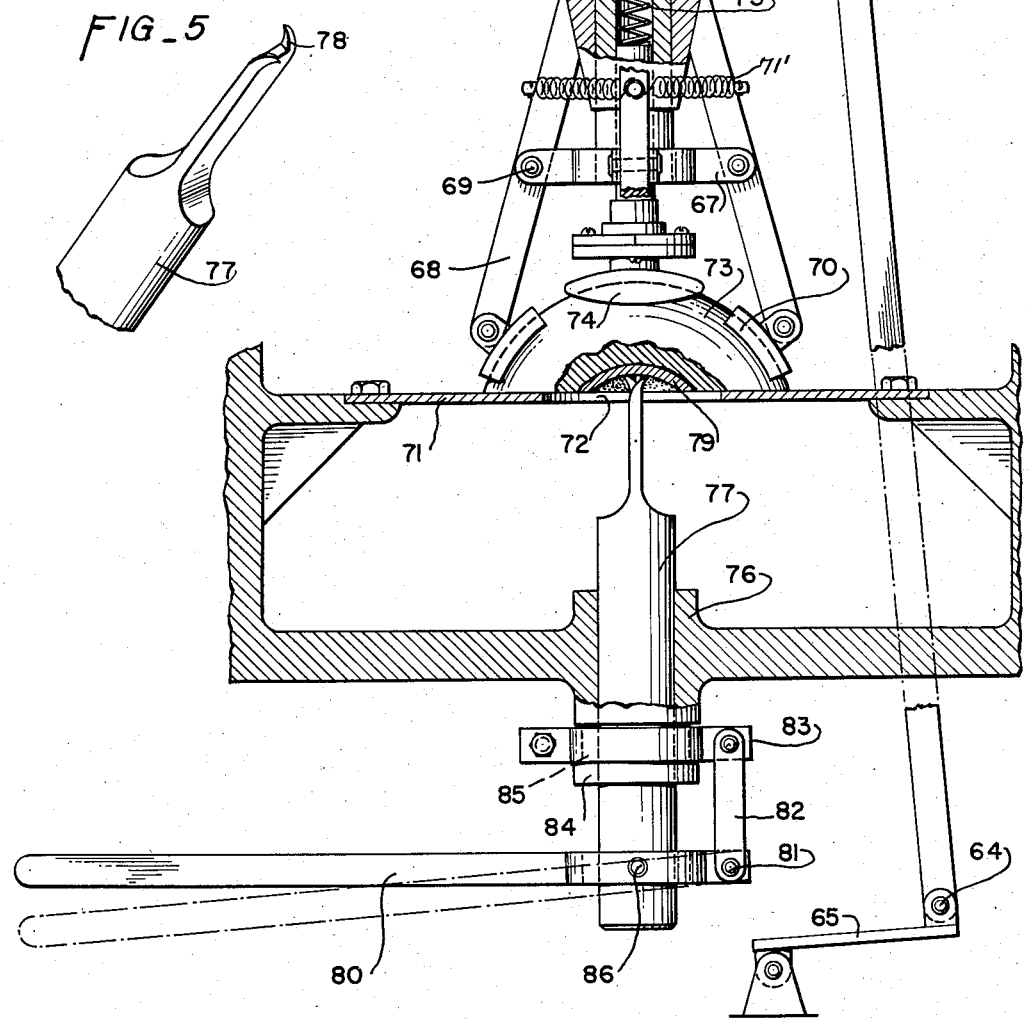
INVENTOR.
JOSEPH PERRELLI
BY
Boylan, Mohler & Wood
ATTORNEYS April 7, 1959
J. PERRELLI
2,880,774
PITTER FOR DRUPES
Filed Aug. 16, 1955
3 Sheets-Sheet 3
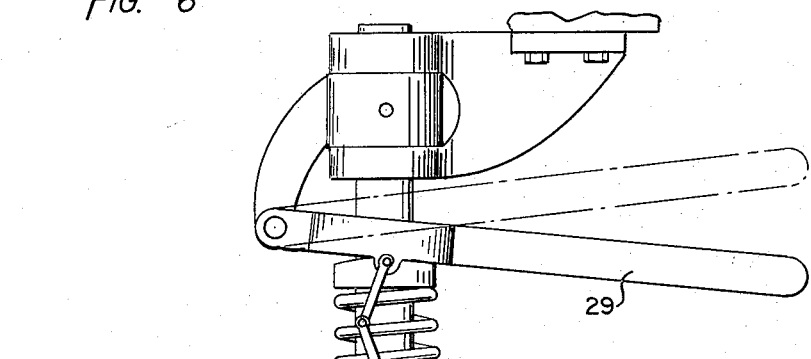
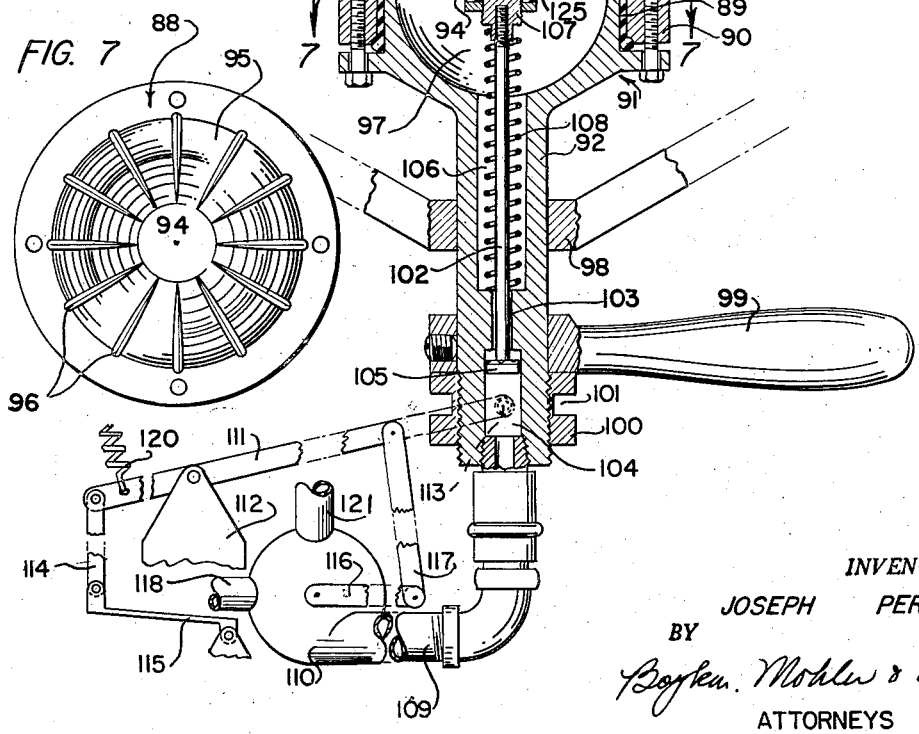
INVENTOR.
JOSEPH PERRELLI
BY
Boyken, Mohler & Wood.
ATTORNEYS

United States Patent Office 2,880,774
Patented Apr. 7, 1959

2,880,774

PITTER FOR DRUPES

Joseph Perrelli, Richmond, Calif., assignor to Filper Corporation

Application August 16, 1955, Serial No. 528,623

2 Claims. (Cl. 146—28)

This invention is a continuation in part of copending application for United States Letters Patent, Serial No. 365,503, filed July 1, 1953, now Patent No. 2,818,098, and has for its objects the provision of means for removing the pit of a half drupe from the flesh thereof by rotating the pit and half relatively.

Another object of the invention is the provision of a pitter for clingstone drupes that is adapted to engage the pit and the flesh of the drupe and to then effect a rotation of the pit while the flesh is held stationary to thereby separate the pit from the flesh.

In United States Letters Patent No. 474,901, issued May 17, 1892, to A. G. Carter, is disclosed an early pitter in which a drupe is intended to be held by the hands of an operator while a blade like element rotatable in the plane thereof is designed to engage the edges of the pit in a toothed notch formed in a side of the blade, after which the blade is rotated while the body of the drupe is held by the hands, thereby both bisecting the body and freeing the pit. Later on Scheidler et al., United States Patent No. 666,701, issued January 29, 1901, provided an upwardly directed table mounted cup for receiving and frictionally holding engaging half of a drupe with the pit exposed on the upwardly facing cut side, and means was provided for frictionally engaging the pit and for twisting it free from the lower half.

The foregoing patents and others each contemplated removal of a whole pit from a half drupe, and in my United States Letters Patent No. 2,664,127 of December 29, 1953, a machine is disclosed that is adapted to remove a whole pit from a drupe.

In the pitting of clingstone drupes where the whole pit is removed in a single operation that may also include bisecting the body of the drupe to the pit, there are instances where the body is bisected, but the pit splits in the plane of its suture. In my copending application, Serial No. 326,832, filed December 19, 1952, now Patent No. 2,775,279, many split pits will be effectively held, and the pitting operation is satisfactorily accomplished, but where the halves and pits separate and the pits are not held, it is necessary to remove the half pits from the body halves.

The device disclosed in the above mentioned application, Serial No. 365,503, and the invention herein disclosed are adapted to remove half pit from the halves of clingstone drupes, such as clingstone peaches by separately gripping or engaging the drupe half and the half pit and effecting relative rotation between them, an operation that involves problems not encountered in the freeing of whole pits from the halves of clingstone drupes.

One of the objects of the present invention is the accomplishment of the above described pitting operation, in which the half pits are removed from the drupe halves, without injury to the fruit and irrespective of the variations in the size of the drupes or the pit halves therein.

The pit halves in the present case are preferably gripped along their sutural edges and the pit half is held against movement perpendicular to the plane of the suture while pressure is applied to the body of the drupe along the central axis of the latter perpendicular to said plane, as well as around the body along a generally circular line coaxial with and spaced from said axis.

Other objects and advantages will appear in the description and in the drawings.

In the drawings,

Fig. 1 is a part elevational and part sectional view of a device illustrative of one form of the invention with the pit being gripped preparatory to severing it from the half with which it is adhered.

Fig. 2 is an enlarged sectional view along line 2—2 of Fig. 1.

Fig. 3 is a fragmentary view of the pit engaging elements in engagement with a whole pit.

Fig. 4 is a vertical sectional view through a modified form of the invention that is shown in Fig. 1.

Fig. 5 is a fragmentary perspective view of the pit engaging element of the device of Fig. 4.

Fig. 6 is a semidiagrammatic showing of a further modification of the invention disclosed in Fig. 1.

Fig. 7 is an enlarged elevational view of the drupe engaging member as seen from line 7—7 of Fig. 6.

In detail, referring to Fig. 1, any suitable stationary frame 1 may be provided, which frame supports a shaft 2 rigid therewith. This shaft may be square in cross sectional contour, or the equivalent, to prevent relative rotation of the elements carried thereon and to prevent their rotation on the shaft.

Slidable on shaft 2 longitudinally thereof is a frustoconical member 3, which, insofar as this invention is concerned, may be polysided or generally pyramidal rather than a true cone.

At the larger diameter end of member 3, and coaxial therewith, is a collar 4, which collar is connected with said cone for slidable movement therewith on said shaft, said collar being formed with outwardly opening recesses 5 at opposite sides for reception of inwardly directed pins 6 on the ends of the arms of a yoke 5a.

Yoke arms 7 have an arm 8 integrally connected therewith, and this arm 8 is pivoted at 9 to any suitable bracket or bearing 10 that is rigid relative to frame 1.

A foot pedal 11 or any other suitable actuating means is pivotally connected to arm 8 by link 12 so that depression of said lever will effect swinging of said arm 8 and a sliding of member 3 on shaft 2 away from frame 1. A spring 13 may connect yoke 7 with said frame 1 or with bracket 10 or any other element that is rigid with said frame for returning the member 3 after pressure on the pedal or treadle 11 is relieved.

Secured on shaft 2 at the side of member 3 opposite the collar 4 are radially projecting forks 15 (preferably four at equally spaced points in a circle concentric with the longitudinal axis of shaft 2). An arm 16 extends between each fork and is pivoted thereto by a pivot 17'.

Arms 16 are equal in length and pivots 17' are at corresponding points along said arms intermediate their ends. One of the ends of each of said arms is in engagement with the outer conical surface of member 3, and the other ends of said arms carry fruit gripping elements 17 substantially as disclosed in said United States Patent No. 2,664,127. Springs 18 connect the arms at points adjacent to said member 3 to maintain the ends of the arms that are at said member in yieldable engagement with the outer sides of the latter.

Upon pressing downwardly on the foot treadle 11, the member 3 will be moved along shaft 2 causing the fruit gripping members to move toward a prolongation of the axis of said shaft and into fruit gripping relation for gripping the body 20 of the drupe.

In the drawings, the body 20 of the drupe is indicated as being one-half of the drupe itself to which the pit half 21 is adhered. Fig. 3 shows a whole pit 22.

Above and coaxial with shaft 2 is an upper shaft 24 that is supported for rotation in bearings 25 that, in turn, are secured to a rigid frame 26 that may be part of frame 1.

A collar 27, between bearings 25, is secured to shaft 24 to function as a thrust bearing and rotates with shaft 24.

A projection 28 on collar 27 extends laterally outwardly and downwardly toward the drupe 20, and pivotally secured to the end of said projection is a lever 29 that, in turn, extends past shaft 24, said lever being enlarged and slotted at 30 to pass said shaft. Thus, the lever 29 may be termed the actuating means for actuating the mechanism that grips the pit 21.

Below said lever or handle, and on shaft 24, is a collar 31 that has an upper cam surface adapted to be engaged by said enlarged and slotted portion 30, so that downward swinging of handle 29 will move collar 31 downwardly along the shaft 24.

Below collar 31 is a spring 33 that, in turn, is around shaft 24, said spring being adapted to react between collar 31 and an annular element 34. Element 34 is below said spring, and said element is also slidable on shaft 24 longitudinally of the latter and is splined to shaft 24.

This element 34 is formed with equally spaced pairs of opposed ears 35 therearound, there being four such pairs shown in the drawing. Between each pair of ears is the upper end of a link 36, which upper end is pivotally connected to each pair of ears as at 37.

The lower end of each link is pivotally connected at 38 to a jaw arm 39 intermediate the ends of each such jaw arm. The upper end of each jaw arm 39, in turn, is pivotally connected to shaft 24 as indicated (Fig. 1).

The lower end of each jaw arm 39 carries the jaw 40. Each jaw 40 is formed with a radially inwardly facing notch 41 (relative to the common axis of shafts 2, 24) and the lower side of each such notch forms a radially inwardly directed point 42.

The radially inwardly facing sides of the notch jaw on each jaw arm is roughened or grooved (Fig. 2) as at 44, and the lowermost end of shaft 24 terminates in a roughened, axially facing end formed with teeth or serrations 45.

A flexible coupling 47 may be positioned at each of the opposite sides of the shaft 24 to connect the portion 30 of the handle 29 with the annular element 34 so that upon upward movement of the handle 29, the element 34 will also be elevated, but said members will hingedly swing to permit transmission of force through spring 33 upon downward movement of the handle 29. Any suitable stop on one of the links of each coupling will prevent their stopping at dead center.

In operation, when spring 13 pulls the collar 4 and conical member 3 downwardly, the gripping elements 17 will swing outwardly and downwardly, and when handle 29 is swung upwardly, the jaws 40 will be pulled outwardly and upwardly so that the body 20 can be positioned on a yieldable receiving cup 50 that is yieldably supported by spring 51 on shaft 2 for downward movement so that the pit 21 will be positioned below the shaft 24 and in yieldable engagement with the points 45 on the lower end of shaft 24.

Upon pressing downwardly on the foot treadle, the elements 17 will tightly grip the body 20 and upon moving handle 29 downwardly, the jaws 40 will tightly grip the pit (21 or 22) at equally spaced points around the latter, and in the plane of the suture of the pit. Upon swinging handle 29 laterally to rotate shaft 24, the gripped pit will be rotated, thus shearing the flesh of the body 20 from the pit.

By this disclosure, it will be seen that the pit is gripped around its peripheral edge for turning or for rotation relative to the body, and no crushing force is applied to the pit so as to objectionably crush the body, although the shaft 24 constitutes a backing in engagement with the pit and the pit is yieldably urged toward said shaft 24 so that the body 20 will not move away from the pit during rotation of the latter.

Fig. 4 shows a modified form of the invention in which a fixed shaft 52 on a frame 53 is similar to shaft 2 of Fig. 1, except that it is shown as extending downwardly instead of upwardly.

Slidable on shaft 52 is a frusto-conical member 54, and at the larger diameter end of the member 54, and coaxial therewith, is a collar 55 that corresponds to collar 4, and that has an annular outwardly opening recess 56 formed therein. Pins 57 on the ends of a yoke 58 extend into recess 56 at opposite sides of collar 55.

Yoke 58 has an arm 59 integrally connected therewith, and arm 59 is pivoted at 60 to any suitable bracket 61 that is rigid relative to frame 53.

The upper end of a rod 62 is pivotally connected at 63 with the arm 59 at a point between pivot 60 and yoke 58, and the lower end of rod 62 is pivotally connected at 64 to one end of a foot pedal or treadle 65. Thus upon depressing pedal 65 the yoke 58 will be swung downwardly to move collar 55 and cone member 54 downwardly.

A spring 66 connected between arm 59 and any suitable stationary means on frame 53 yieldably holds the cone member 54 is its uppermost position on shaft 52.

Secured on shaft 52 at the side of member 54 opposite to collar 55 are four radially outwardly projecting forks 67 at equally spaced points on a circle concentric with the longitudinal axis of shaft 52. An arm 68 extends between the sides of each fork and is pivoted to said sides by a pivot 69.

The arms 68 are the same as arms 16 and engage the outer conical surface of member 54 at one of their corresponding ends, while their opposite ends carry fruit gripping elements 70. Springs 71' connect arms 68 adjacent to member 54 to maintain the ends of the arms that are at said member in yieldable engagement with the outer sides of the latter.

Upon pressing downwardly on the foot pedal 65, the member 54 will be moved along shaft 52 causing the fruit gripping elements 70 to move toward the axis of said shaft and into fruit gripping relation with the outer surface of body 73 for gripping said body.

Below the fruit gripping elements 70 is a horizontal stationary plate 71 having a central aperture 72 therein coaxial with shaft 52.

This plate forms an abutment for the cut face of a peach or drupe half 73, and when such half is supported against plate 71 in pitting position, the pit extends across the aperture 72.

The lower end of shaft 52 carries a yieldable pad or cup 74 that corresponds to the cup 50 of Fig. 1 and a spring 75 within shaft 52 reacts against a stem on pad 74 to permit the peach half 73 to be positioned on plate 71 and to be yieldably held against the latter by the pad 74.

Plate 71 is preferably rigid with the main frame 53 and also rigid with said frame is a bearing 76 that slidably supports a shaft 77 for longitudinal movement coaxial with shaft 52. This shaft 77 carries pit engaging teeth 78 at its upper end, which teeth are directed oppositely at opposite sides of the axis of said shaft, so as to positively engage the portion of pit 79 that is exposed through opening 72 and to rotate said pit half relative to the body 73 upon rotating shaft 77 in the direction in which said teeth extend.

An arm 80 is pivoted at 81 at one end thereof to one end of a link 82, which link, in turn, is pivoted at its opposite end to a collar 83. Collar 83 is rotatable through part of a circle between bearings 76, 84, the latter being rigidly connected to bearing 76 by an arm 85.

Arm 80 is pivotally secured to the lower end of the shaft 77 by a pivot 86 that may extend through the arm and shaft 77.

By the above structure, after a peach half, for example, is supported on plate 71 and is gripped by the elements 70 with the pit half 79 exposed through aperture 72, the arm 80 may be swung upwardly and then swung about the axis of shaft 77 to rotate the latter in the direction in which the teeth 78 extend, whereupon said teeth will engage the pit and rotate it relative to the body of the peach half. The pad 74 will force the central portion of the drupe half along the axis of the shaft 77 toward said latter shaft to prevent the pit half from tearing away from the pit at any point except at the surface of the pit.

It is seen that the main difference between Figs. 1 and 4 is that the shaft 77 is substituted for the pit gripping members 40 and their associated parts, and a plate 71 is provided as a support for the drupe half. The opening 72 in plate 71 is large enough to pass the fingers or members 40 of Fig. 1 should the latter (including shaft 24) be substituted for shaft 77.

In Fig. 6, the pit gripping structure of Fig. 1 is the same as in Fig. 1, and the same description for Fig. 1 will apply to said pit gripping structure, with the same members being used.

In Fig. 6 the plate 71 of Fig. 4 is also used. The main distinction between the form of invention shown in Fig. 6 and in the other figures is in the drupe engaging and gripping member and in the means for actuating it.

The means for gripping the drupe half in Fig. 6 comprises an annular, flexible, rubber or rubber-like diaphragm 88 that is impervious to the passage of air therethrough.

This diaphragm 88 is of inverted cup shape having cylindrical side walls 89 that are held by a clamping ring 90 against the sides of an upwardly opening circular bowl 91 integral with and supported on the upper end of a cylindrical post 92.

The diaphragm extends across the open upper side of the bowl 91 and is preferably formed with a slightly depressed central portion 94 that connects with side walls 89 by an upwardly rounded marginal portion 95. The upper surface of the diaphragm is formed with radially outwardly extending ribs 96 (Fig. 7) which ribs are of the same relatively soft material of the diaphragm so as not to break or injure the skin and flesh of the drupe half when in tight engagement therewith.

The space 97 within the bowl 91 and below diaphragm 88 forms an air chamber for air under pressure.

The post 92 slidably and rotatably extends through stationary bearing 98 that is similar to bearing 76 of Fig. 4, and below said bearing is a handle 99 projecting laterally from the post for grasping by the hand of an operator. This handle is rigidly secured to post 92.

At the lower end of the post 92 is a collar 100 that is secured to said post, and which collar has a radially outwardly opening groove 101 formed therein.

A stem 102 is positioned centrally within post 92 in a bore 103 that has a square counter bore 104 at its lower end in which the square head 105 of the lower end of stem 102 is slidably but nonrotatably positioned. A counter bore 106 coaxial with bore 103 opens into the space 97 of the bowl.

Secured to the central portion 94 of the diaphragm 88 on the underside, either by molding or by any suitable clamping means, is an internally threaded boss 107 in which the upper threaded end of stem 102 is secured. A shoulder may be formed on the stem 102 at the juncture between its upper threaded end and the remainder thereof for abutment against the boss 107, and a spring 108 in counterbore 106 reacts between boss 107 and the lower end of the counterbore to yieldably urge the diaphragm 88 upwardly and to stabilize the said diaphragm, as will later be explained.

It should be mentioned that air may pass through bore 103 and the counterbores at opposite ends thereof into the chamber 97 from the lower end of post 92.

Secured in bore 104 at the lower end of post 92 is a nipple and elbow fitting connecting with a flexible hose 109 that in turn connects with a three-way valve 110.

A lever 111 is pivoted intermediate its ends to a stationary support 112. One end of this lever is provided with a fork having coaxial pins 113 at the ends of the fork extending into groove 101, while the opposite end of the lever is pivotally connected to the upper end of a link 114, which link, in turn, is pivotally connected at its lower end to one end of pivotally supported foot treadle or pedal 115.

Valve actuating arm 116 is pivotally connected at its outer end to the lower end of a connecting rod 117, which rod, in turn is pivotally connected at its upper end with the portion of lever 111 that extends between support 112 and the collar 100. A spring 120 may be connected with lever 111 and any suitable stationary support, such as part of the frame carrying bearing 98, for yieldably urging the lever 111 to a position in which post 92 is at lower end of its stroke, and the treadle 115 is elevated.

In operation, when the post 92 is at the low end of its stroke, the valve arm 116 is actuated for exhausting air from the chamber 97 through exhaust 118. When in this position the diaphragm 88 is elevated so only a slight depression is in the center thereof, and the operator positions a half drupe 119 on said diaphragm with its convex lower side 125 in said depression and with its cut face 126 directed toward plate 71.

The treadle 115 is then pressed downwardly thereby moving post 92 upwardly so that the diaphragm 88 will be further depressed as the ribbed upper surface extends upwardly along the convex sides of the drupe, and at the same time, air is admitted into the chamber 97 through the air pressure line 121 leading to valve 110 to firmly force the diaphragm against the said drupe. The stem 102 exerts an added force against the central portion of the drupe, similar to the central member 50 of Fig. 1, and this stem also stabilizes the center of the diaphragm.

In the meantime, the operator may move handle of the pit gripping member downwardly so that the pit is gripped by the ends 40 thereof.

It will be seen from the foregoing that at this point the fruit body will be firmly gripped with its cut face pressed against the plate 71 and the pit will also be gripped. At this point the operator may rotate both handle 29 and handle 99 oppositely, or he may hold either of the two handles stationary and rotate the other about the axis of post 92. In any event, the pit will be separated from the fruit. Upon release of the foot treadle, the diaphragm will be lowered and the air exhausted.

The fact that the head 105 of the stem 102 is square insures rotation of the stem with post 92 as handle 99 is rotated, or as a twisting force is placed on the pit, thus preventing the diaphragm from tending to be twisted. Also the pressure exerted by the spring 108 on the central portion of the diaphragm is desirable. This pressure is the one that is initially applied upon each half being engaged by the diaphragm.

Although the above description covers the removal of a half pit from a drupe half, it will be understood that the same operations apply to the removal of a whole pit. In the latter case, and as is apparent from Fig. 3, it is merely necessary to employ a shorter shaft 24 (Fig. 1) to remove whole pits. This may be accomplished by the use of interchangeable shafts 24. However, if the thickness of the pit is not too great, it is possible to remove a whole pit with the apparatus of Fig. 1 in some cases.

I claim:

1. Apparatus for pitting one generally hemispherical half of a clingstone peach body that has a convex surface on one side thereof and a flat cut face on the other side and a pit cavity in said cut face having an exposed pit adhered thereto comprising: a frame, pit engaging means supported on said frame for movement into pit gripping relation with such exposed pit at spaced points around the latter extending across the plane of the suture of the pit, means on said frame connected with said pit engaging means for causing said movement thereof, peach positioning means on said frame adjacent to said pit engaging means and separate therefrom adapted to engage the cut face of such peach half when the said pit in its pit cavity is in a position for gripping by said pit engaging means, peach gripping means on said frame in a position for supporting such peach half against its said convex side with its flat cut face against said peach positioning means, and means respectively connected with said pit engaging means and with said peach gripping means for rotating one relative to the other about an axis perpendicular to said cut face for freeing said pit from said peach half.

2. Apparatus for pitting one generally hemispherical half of a clingstone peach body that has a convex surface on one side thereof and a flat cut face on the other side and a pit cavity in said cut face having an exposed pit adhered thereto comprising: a frame, pit engaging means supported on said frame for movement into pit gripping relation with such exposed pit at spaced points around the latter extending across the plane of the suture of the pit, means on said frame connected with said pit engaging means for causing said movement thereof, peach positioning means on said frame adjacent to said pit engaging means and separate therefrom adapted to engage the cut face of such peach half when the said pit in its pit cavity is in a position for gripping by said pit engaging means, peach gripping means on said frame in a position for supporting such peach half against its said convex side with its flat cut face against said peach positioning means, and means respectively connected with said pit engaging means and with said peach gripping means for rotating one relative to the other about an axis perpendicular to said cut face for freeing said pit from said peach half, said peach positioning means comprising a flat plate at two opposite sides of such pit and stationary relative to said pit engaging means during movement of the latter into pit engaging relation.

References Cited in the file of this patent
UNITED STATES PATENTS

| | | |
|---|---|---|
| 666,701 | Scheidler et al. | Jan. 29, 1901 |
| 2,187,063 | Thompson et al. | Jan. 16, 1940 |
| 2,518,274 | Besag | Aug. 8, 1950 |
| 2,664,127 | Perrelli | Dec. 29, 1953 |
| 2,730,149 | Aguilar et al. | Jan. 10, 1956 |